Nov. 4, 1958
D. L. JAFFE
2,859,406
POWER-INDICATING APPARATUS
Filed Sept. 8, 1955
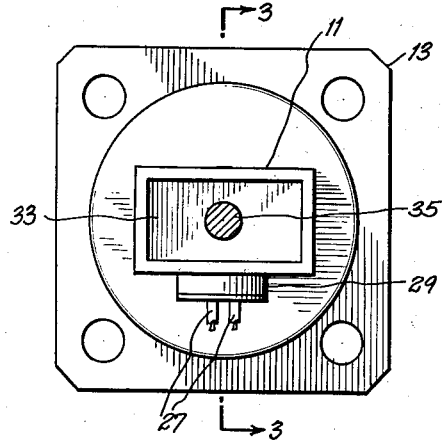
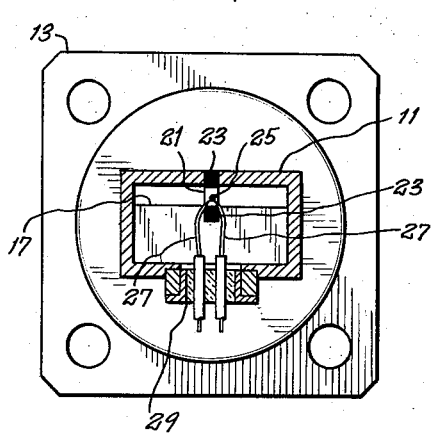
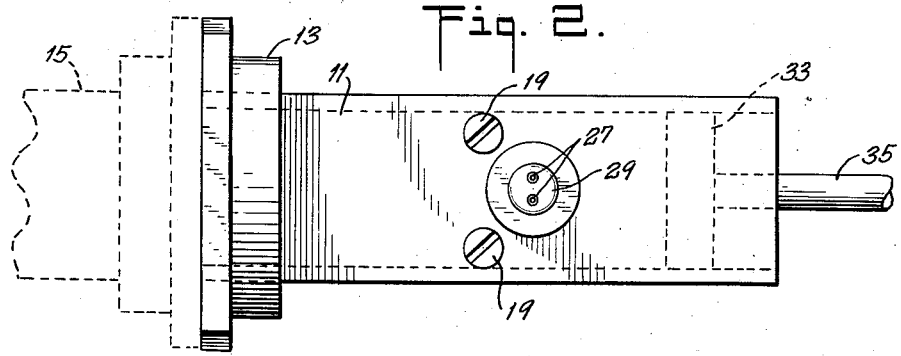
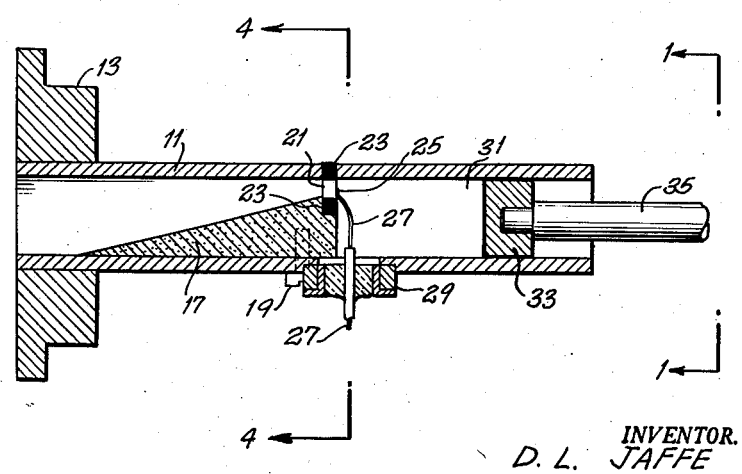
INVENTOR.
D. L. JAFFE
BY Darby & Darby
ATTORNEYS

2,859,406

POWER-INDICATING APPARATUS

David Lawrence Jaffe, Great Neck, N. Y., assignor to Polarad Electronics Corporation, Long Island City, N. Y., a corporation of New York Application September 8, 1955, Serial No. 533,079

7 Claims. (Cl. 324—95)

The present invention relates to apparatus for indicating electrical power and is more particularly concerned with apparatus for sensing and responding to microwave power in waveguides or the like. This application is a continuation-in-part of my prior application Serial No. 414,733 filed March 8, 1954.

In the art of measuring microwave power a number of basic methods have been used heretofore. One such method is the calorimetric method by which the incident power is absorbed and dissipated in a fluid whose rate of flow, rise in temperature, and known physical constants can give an absolute measurement of the dissipated power. This method has suffered from the practical disadvantage of requiring a continuous flow of fluid and sensitive and accurate temperature-measuring devices, and has not come into substantial practical use because of the appreciable time required to obtain a determination.

A second method has been to utilize a power-sensitive element which changes some electrical characteristic in response to the incident power, this change in characteristic being indicated to provide an indication of the dissipated power. Because of its greater convenience and simplicity, the power-sensitive element method has come into extensive use, utilizing a variety of types of power-sensitive elements, the most common of which has been an element which varies its resistance in response to the incident power. Such elements often are utilized to terminate a waveguide section to which is supplied a predetermined known sampling of the power being measured.

Such devices heretofore have been subject to the disadvantage that for most efficient and sensitive use, the resistance of the power-sensitive element must vary widely. This in turn means that the impedance presented by the power-sensitive element to the waveguide in which it is mounted, instead of being matched over the complete range of power being measured, so as properly to terminate the waveguide, will vary widely and create problems of mismatch resulting in standing waves, loss of efficiency and improper calibration.

The present invention provides a power-sensitive element for a waveguide wherein the function of absorbing microwave power and matching the impedance of the waveguide is separated from the function of measuring the power dissipation. According to the present invention, instead of utilizing the resistance variation of a power-sensitive element for indication of power dissipation, there is used instead a temperature change. The power-sensitive element is designed so that it will have as small a resistance variation as is practicable, by suitable choice of its own materials to have low temperature characteristics and by mounting it in relatively massive heat-conducting materials to reduce its range of temperature variation. The amount of power dissipated in such a resistor will of course vary its temperature, and this temperature variation is then utilized to provide the desired indication of power.

The power-sensitive element mount forming the present invention is found to be relatively simple in construction and fabrication and provides a simple and ready means of connection to other circuit elements for providing a direct indication of power.

Other objects and advantages of the present invention will become more fully apparent from consideration of the following description of a preferred embodiment thereof taken in conjunction with the appended drawings, in which Fig. 1 shows an end elevational view of a power-sensitive mount according to the present invention.

Fig. 2 shows a bottom view of the device of Fig. 1.

Fig. 3 shows a longitudinal elevational cross-sectional view of the device viewed along line 3—3 of Fig. 1, and Fig. 4 shows a cross-sectional elevational view of the same device viewed along line 4—4 of Fig. 3.

Referring to the drawings, the waveguide section 11, which is illustratively shown as rectangular in cross section, although it may have any desired cross-sectional shape, has at one end a conventional flange coupling 13 for connecting it to any suitable waveguide circuit, indicated schematically in dotted lines at 15. Any conventional coupling device may be used, or the present invention may be incorporated in any desired waveguide. Waveguide section 11 has a wedge or taper 17 fixed therein by any suitable means as for example by means of screws 19. This tapered wedge 17 is preferably of conductive material, but may also have power-absorbing qualities added where desired, and serves the function of an impedance transformer for coupling efficiently the waveguide section 11 to the power-sensitive element 21, which may have a different impedance from the desired characteristic or terminating impedance of the waveguide section 11. Where the power-sensitive element 21 has the same impedance as the desired characteristic or terminating impedance of the waveguide section 11, the tapered wedge 17 may be omitted.

The power-sensitive element 21 is preferably a metallized film resistor formed in known manner as a thin metallic film deposited on a glass or ceramic rod and having end terminals 23. Such resistors are generally available commercially; for example, one type is known as a Type R resistor, supplied by Telewave Laboratories, Inc., of Brooklyn, New York.

The power-sensitive element 21 is mounted lengthwise of the electric field within the waveguide section 11 and has one terminal 23 embedded directly into the waveguide wall at one end and the other terminal 23 in the end of the tapered wedge 17, both terminals 23 being soldered or pressed into apertures in their respective seats for good electrical and heat conductivity. Element 21 thereby absorbs the incident microwave energy flowing rightward from coupling 13, causing the temperature of element 21 to rise due to the power dissipation therein. Element 21 has as low a temperature coefficient of resistance as is practicable. Most desirably, its resistance remains substantially uniform regardless of the amount of energy dissipation therein. However, as a practical matter, slight variations in resistance are inherent and unavoidable and may be tolerated. By solidly joining terminals 23 to the waveguide wall and to wedge 17, good heat conductivity is established which tends to prevent excessive resistance change due to temperature variations. At the same time, the temperature of the metal film forming the element 21 will vary with power dissipation, especially at the center equidistant from the terminals 23.

Cemented to the resistor film of the element 21, and preferably at the center thereof, is a bead thermistor 25 which has the property of varying its resistance sharply in response to changes in temperature. One commercially available type of thermistor suitable for this purpose is the Type 32A5 supplied by the Victory Engineering Company of Union, New Jersey. The thermistor 25 is cemented in close heat-exchanging relationship to the element 21 in such fashion that it is sensitive to and efficiently responsive to changes in temperature of the element 21.

In order that the thermistor 25 and its leads 27 shall not have any harmful effect upon the exchange of microwave power between waveguide 11 and element 21, the thermistor 25 is mounted on the side of element 21 away from the coupling 13, and the leads 27 for the thermistor 25 are essentially shielded behind element 21 and the wedge 17. Where the electromagnetic field adjacent thermistor 25 is appreciable and might be affected by leads 27, these leads may extend for a distance axially of the device and perpendicularly of the electric field component for minimum interaction therewith. These leads 27 are led through a ceramic or glass seal 29 in the wall of wave guide 11 to the exterior of the device, whereby connections may be made to an external circuit whose details form no part of the present invention, in which variations in resistance of the thermistor 25 are translated into indications of dissipated power. For example, suitable bridge circuits for detecting and measuring changes in resistance may be utilized.

The end 31 of waveguide 11 beyond element 21 is provided with an adjustable short-circuiting plunger 33 actuated by a rod 35 whose adjustment effectively varies the length of waveguide between the power-sensitive element 21 and the short-circuiting plunger 33. In practice, the short-circuiting plunger 33 is positioned so that the reactance presented by the waveguide section 31 in back of the element 21 serves to tune out and compensate for any stray reactances which may exist at the element 21. When operating over a limited frequency range, the position of the short-circuiting plunger 33 may be set at an optimum value, such as the center of the normal operating range, and left there without change.

The operation of the device just described will now be clear. The incident microwave power to be measured is supplied to the power-dissipating element 21 whose impedance is matched to that of the waveguide being used. The incident power is hence efficiently dissipated in the element 21 and converted into heat. However, because of the basic design and choice of materials, the resistance of element 21 will not essentially vary. In one example, for a 50 ohm nominal value of element 21, it changed in resistance by ½ ohm during operation over the entire range of power being measured, from zero to a few hundred milliwatts. However, element 21 does change markedly in temperature, and the thermistor 25, being extremely sensitive to changes in temperature, produces a very large change in its own resistance. This change was as much as 100% for maximum range of power dissipation. This marked change in resistance of course is readily indicated and converted into or calibrated in terms of the power dissipated.

It will be understood that the present invention is not limited to use with waveguides or microwaves, but may be utilized with any form of transmission line and over a wide range of frequencies.

Accordingly, by the present invention an essentially fixed value of terminating impedance is supplied for a transmission line or waveguide while at the same time providing a wide change in resistance appearing between leads 27 for use in indicating power dissipation. Thus, while the change in terminating impedance with power is kept extremely small to maintain proper matching, the change in indicating resistance with power is made large for sensitive power indication.

It will also be seen that the present invention offers considerable advantages in fabrication. The terminating resistor 21 is commercially available and is simply mounted in the waveguide 11 and wedge 17 by direct soldering or similar joining thereto, without the requirement of special mount supports, choke joints or connections. The leads 27 are used only in a low frequency or direct current circuit for detecting changes of resistance, and their mounting is also extremely simple, being an essentially conventional flat bead mount 29.

Accordingly, the present invention has provided an extremely simply fabricated and efficient mount for a power-sensitive element by which the functions of absorbing power and matching the line to the incident power is separated from the function of providing an indication of the incident power, so that proper matching can be maintained despite wide changes in power dissipation.

It is to be understood that the foregoing description is illustrative only and is not to be taken in a limiting sense, since the scope of the invention is defined solely by the appended claims.

What is claimed as the present invention is:

1. Microwave power-detecting apparatus comprising a waveguide section, a tapered wedge extending partially along said waveguide section, a power-dissipating resistor extending across said waveguide in the direction of the electric field between one wall thereof and said wedge and having terminals respectively embedded in said wall and said wedge in good heat-conducting relationship thereto, said wedge providing an impedance-transforming means matching the impedance of said resistor to said waveguide section, said resistor having relatively low temperature coefficient of resistance and forming a termination for said waveguide section, a thermistor cemented to said resistor substantially at the center thereof and on the side away from the direction of power flow toward said resistor, said thermistor being in close heat-conducting and temperature-transferring relationship to said resistor and having a relatively high temperature coefficient of resistance, a pair of leads for said thermistor extending outwardly of said waveguide section and an adjustable short-circuiting member extending across said waveguide section behind said resistor, whereby said waveguide section remains substantially uniformly terminated over the range of power being measured without impairing the power-sensitivity of said apparatus, and means for compensating for reactance of said resistor.

2. Microwave power-detecting apparatus comprising a waveguide section, a tapered wedge extending partially along said waveguide section, a power-dissipating resistor extending across said waveguide in the direction of the electric field between one wall thereof and said wedge and having terminals respectively connected to said wall and said wedge in good heat-conducting relationship thereto, said wedge providing an impedance transforming means matching the impedance of said resistor to said waveguide section, said resistor having a relatively low temperature coefficient of resistance and forming a termination for said waveguide section, and a temperature sensitive resistor cemented to said power dissipating resistor substantially at the center thereof and on the side away from the direction of power flow toward said power dissipating resistor, said temperature sensitive resistor being in close heat-conducting and temperature-transferring relationship to said power dissipating resistor and having a relatively high temperature coefficient of resistance.

3. Microwave power detecting apparatus comprising a waveguide section, a tapered wedge extending partially along said waveguide section, a power-dissipating resistor extending across said waveguide in the direction of the electric field between one wall thereof and said wedge and having terminals respectively connected to said wall and said wedge in good heat-conducting relationship thereto, said wedge providing an impedance transforming means matching the impedance of said resistor to said waveguide section, said resistor having a relatively low temperature coefficient of resistance and forming a termination for said waveguide section, a temperature sensitive resistor cemented to said power dissipating resistor substantially at the center thereof and on the side away from the direction of power flow toward said power-dissipating resistor, said temperature sensitive resistor being in close heat-conducting and temperature-transferring relationship to said power-dissipating resistor and having a relatively high temperature coefficient of resistance, and means for compensating the reactance of said power-dissipating resistor.

4. A power detecting apparatus comprising a transmission line section having an input end, a resistor connected across said line section in the direction of the electric field and in good heat-exchanging relation thereto to be responsive to and to dissipate power flowing therein, a tapered structure extending along a portion of said section for matching the impedance of said resistor to that of said section, said resistor having a low temperature coefficient of resistance whereby it maintains substantially uniform resistance value regardless of the amount of power dissipating therein, a temperature-sensitive resistance element mounted substantially on the center of said resistor in temperature-transferring relationship thereto, whereby power dissipated in said resistor produces a change in resistance of said resistance element, and means for compensating for reactance interposed by said resistor in said line section.

5. Microwave power-detecting apparatus comprising a waveguide section, a tapered wedge extending partially along said waveguide section, a power-dissipating resistor extending across said waveguide in the direction of the electric field between one wall thereof and said wedge and having terminals respectively connected to said wall and said wedge in good heat-conducting relationship thereto, said wedge providing an impedance transforming means matching the impedance of said resistor to said waveguide section, said resistor having a relatively low temperature coefficient of resistance and forming a termination for said waveguide section, and a temperature-sensitive resistor mounted on said power-dissipating resistor substantially at the center thereof, said temperature-sensitive resistor being in close heat-conducting and temperature-transferring relationship to said power-dissipating resistor and having a relatively high temperature coefficient of resistance.

6. Microwave power-detecting apparatus comprising a waveguide section, a tapered wedge extending partially along said waveguide section, a power-dissipating resistor extending across said waveguide in the direction of the electric field between one wall thereof and said wedge and having terminals respectively connected to said wall and said wedge in good heat-conducting relationship thereto, said wedge providing an impedance transforming means matching the impedance of said resistor to said waveguide section, said resistor having a relatively low temperature coefficient of resistance and forming a termination for said waveguide section, and a temperature-sensitive resistor mounted on said power-dissipating resistor on the side away from the direction of power flow toward said power-dissipating resistor, said temperature-sensitive resistor being in close heat-conducting and temperature-transferring relationship to said power-dissipating resistor and having a relatively high temperature coefficient of resistance.

7. Microwave power-detecting apparatus comprising a waveguide section, a tapered wedge extending partially along said waveguide section, a power-dissipating resistor extending across said waveguide in the direction of the electric field between one wall thereof and said wedge and having terminals respectively connected to said wall and said wedge in good heat-conducting relationship thereto, said wedge providing an impedance transforming means matching the impedance of said resistor to said waveguide section, said resistor having a relatively low temperature coefficient of resistance and forming a termination for said waveguide section, and a temperature-sensitive resistor mounted on said power-dissipating resistor substantially at the center thereof and on the side away from the direction of power flow toward said power-dissipating resistor, said temperature-sensitive resistor being in close heat-conducting and temperature-transferring relationship to said power-dissipating resistor and having a relatively high temperature coefficient of resistance.

References Cited in the file of this patent

UNITED STATES PATENTS

| | | |
|---|---|---|
| 2,413,021 | Wolfson et al. | Dec. 24, 1946 |
| 2,442,619 | Schmitt | June 1, 1948 |
| 2,464,277 | Webber | Mar. 15, 1949 |
| 2,485,904 | Miller | Oct. 25, 1949 |
| 2,576,060 | Wolf | Nov. 20, 1951 |
| 2,648,047 | Hollingsworth | Aug. 4, 1953 |